(No Model.) 2 Sheets—Sheet 1.

H. J. BREWER.
GALVANIC BATTERY.

No. 380,856. Patented Apr. 10, 1888.

WITNESSES:
Chas. Nida.
C. Sedgwick.

INVENTOR:
H. J. Brewer.
BY Munn & Co.
ATTORNEYS (No Model.) 2 Sheets—Sheet 2.
H. J. BREWER.
GALVANIC BATTERY.

No. 380,856. Patented Apr. 10, 1888.

WITNESSES:
Chas. Nida
C. Sedgwick

INVENTOR:
H. J. Brewer
BY Munn & Co.
ATTORNEYS.

UNITED STATES PATENT OFFICE.

HORATIO J. BREWER, OF NEW YORK, N. Y.

GALVANIC BATTERY.

SPECIFICATION forming part of Letters Patent No. 380,856, dated April 10, 1888.

Application filed February 19, 1887. Renewed December 31, 1887. Serial No. 259,482. (No model.)

*To all whom it may concern:*

Be it known that I, HORATIO J. BREWER, of the city, county, and State of New York, have invented a new and Improved Galvanic Battery, of which the following is a full, clear, and exact description.

My invention relates to galvanic batteries in which the negative electrode consists of two bodies of electro-negative material attached to a conductor of carbon or other suitable material.

The object of my invention is to provide certain new and useful improvements in galvanic batteries in which the electrodes are themselves made to form a cover for the jar to prevent spilling and evaporation of the exciting-liquid, and in which the positive electrode is drawn nearer the center of the cell and within the circumference of the negative electrode, thereby decreasing the internal resistance and greatly increasing the efficiency of the cell.

The invention consists of a jar having its mouth formed by an outwardly-extending flange, of electrodes held together by elastic bands, of which the upper one rests on the said flange of the jar, thus supporting the electrodes in the jar, and also forming a tight joint between the electrodes and the jar to prevent the spilling of the exciting-liquid.

The invention also consists of various parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1:
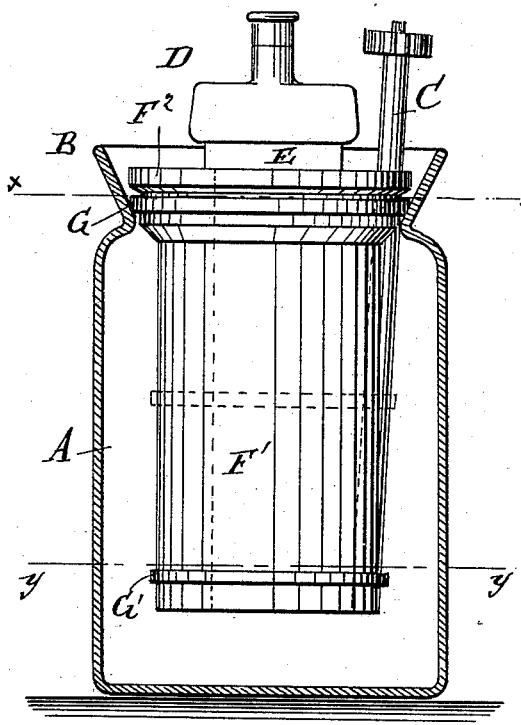
Figure 2:
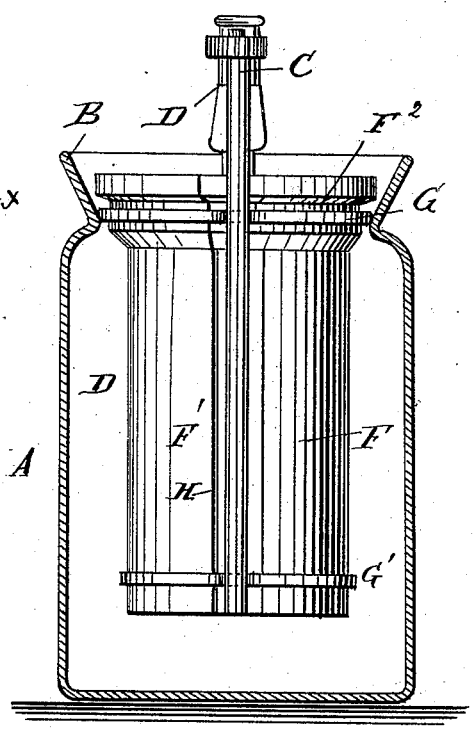
Figure 3:
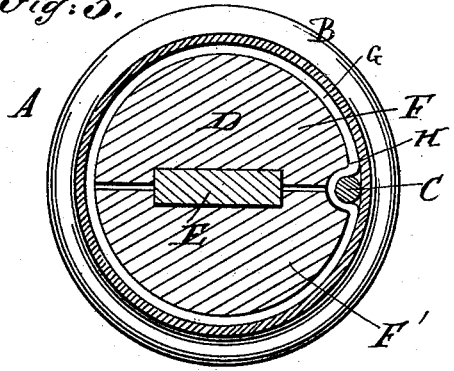
Figure 4:
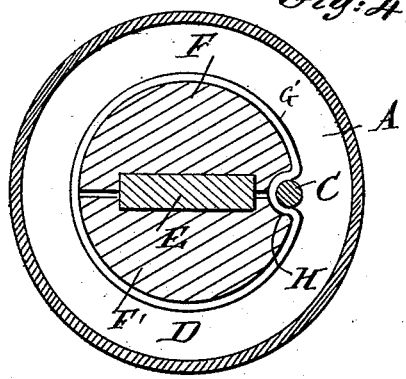
Figure 5:
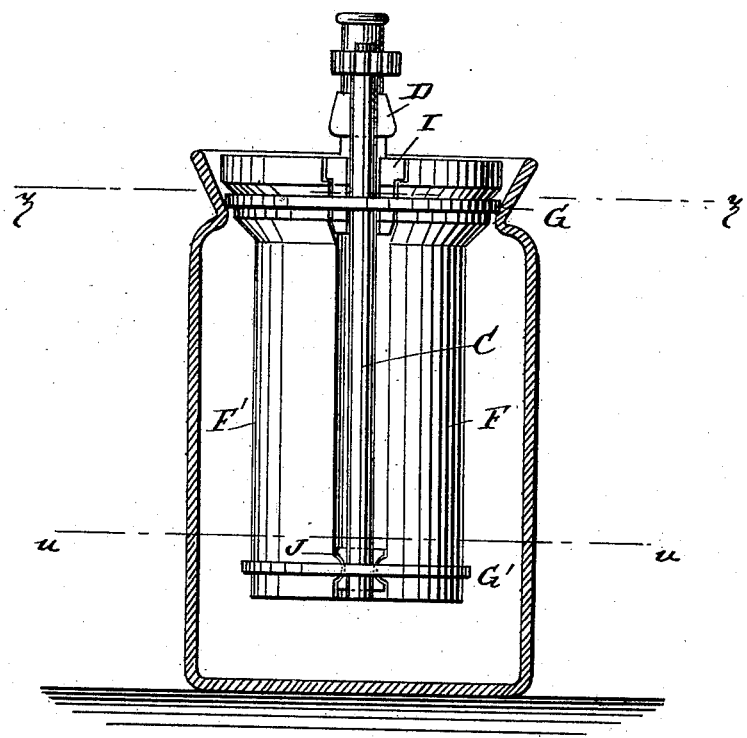
Figure 6:
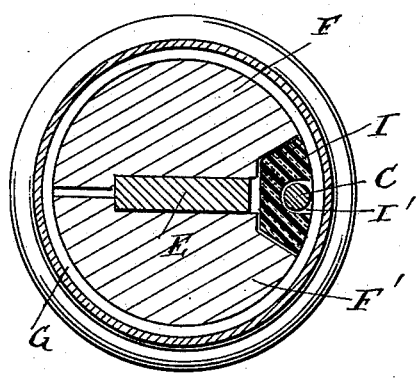

Figure 1 is a side elevation of my improvement with the jar in section. Fig. 2 is a front elevation of the same with the jar in section. Fig. 3 is a sectional plan view of the same on the line $xx$ of Fig. 1. Fig. 4 is a similar view of the same on the line $yy$ of Fig. 1. Fig. 5 is a front elevation of a modified form of my improvement with the jar in section. Fig. 6 is a plan view of the same on the line $zz$ of Fig. 5; and Fig. 7 is a similar view of the same on the line $uu$ of Fig. 5.

The jar A is provided at its mouth with the outwardly-extending flange B, which supports the positive and negative electrodes C and D, respectively. The negative electrode D consists of a carbon plate, E, provided at its upper end with the usual binding-post and held tightly between the plates F and F' by the elastic bands G and G', of which the band G passes around the head $F^2$, formed on the said plates F and F'. The elastic band G' passes around the lower portions of the said plates F and F', and serves to hold the lower part of the electrodes together.

The lower part of the negative electrode, formed by the carbon plate E and the plates F and F', is sufficiently small to pass through the smallest diameter of the jar A, while the head $F^2$ of the said electrode is larger, and the elastic band G rests upon the flange B, which thus supports the electrodes in the jar. On one side, along the whole length of the negative electrode D, is formed a recess, H, which is sufficiently large to permit the entrance of parts of the elastic bands G and G' and the positive electrode C, as shown in Figs. 3 and 4. When the two electrodes C and D are placed in the jar A, the positive electrode C is inserted opposite the said recess H between the inner projection of the jar A and the upper elastic band, G, which presses the upper part of the electrode C outward and toward the flange B of the jar. The electrode C is thus held in place and supported in the jar A. Its lower end is thrust inward by the inner projection against the lower elastic band, G', and while being within the circumference of the negative electrode D is effectively insulated therefrom by the two elastic bands G and G'. When the electrodes C and D are in place in the jar A, the elastic band G is seated on the flange B, thus supporting both electrodes C and D, and at the same time forming with the head $F^2$ and the electrode C a cover for the jar A.

Figure 7:
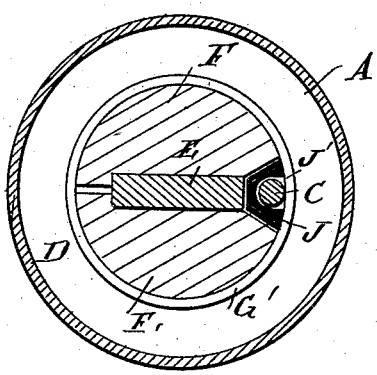

Instead of holding the electrode C at its upper and lower parts in the manner shown and described I may employ the means represented in Figs. 5, 6, and 7, in which I provide the head $F^2$ with a recess which supports loosely the insulating-block I, having a recess, I', which forms a bearing for the upper part of the electrode C. The elastic band G is in this case placed over the outside of the electrode C and presses the latter inward into the recess I', thus holding the upper part of the electrode in place.

The lower part of the electrode C is held in a recess, J', in a similar insulating-block, J, by the elastic band G', which also passes over the outside of the electrode D. The diameter of the band G' when in place is somewhat smaller than the diameter of the neck of the jar, so as to permit of removing the electrodes C and D in a bunch from the jar. The elastic band G also forms in this case a complete ring and rests on the flange B of the jar A, thus supporting the electrodes C and D, and also forming in conjunction with the latter a cover for the jar A.

Having thus described my invention, what I claim as new, and desire to secure by Letters Patent, is—

1. In a galvanic battery, the combination, with a jar having its mouth formed by an outwardly-extending flange, of positive and negative electrodes held together by elastic bands, of which the upper one rests on the said flange and supports the electrodes in the jar, substantially as shown and described.

2. In a galvanic battery, the combination, with a jar having its mouth formed by an outwardly-extending flange, of the negative electrode having a head, an elastic band passing around the said head, and the positive electrode pressed by the said elastic band against the flange of the jar, substantially as shown and described.

3. In a galvanic battery, the combination, with a jar having its mouth formed by an outwardly-extending flange, of the negative electrode, consisting of a carbon-plate and two plates pressed against the said carbon-plate, and the said plates having a recess extending throughout their length, a head formed on the said plates, an elastic band passing around the said head, and the positive electrode held in the said recess, pressed by the said elastic band against the said flange of the jar, substantially as shown and described.

HORATIO J. BREWER.

Witnesses:
THEO. G. HOSTER,
C. SEDGWICK.